United States Patent
Reinke

(10) Patent No.: US 8,342,464 B2
(45) Date of Patent: Jan. 1, 2013

(54) STAND

(76) Inventor: Peter Reinke, Zürich (CH)

(*) Notice: Subject to any disclaimer, the term of this patent is extended or adjusted under 35 U.S.C. 154(b) by 799 days.

(21) Appl. No.: 12/438,616

(22) PCT Filed: Aug. 10, 2007

(86) PCT No.: PCT/EP2007/007110
§ 371 (c)(1),
(2), (4) Date: Feb. 24, 2009

(87) PCT Pub. No.: WO2008/028554
PCT Pub. Date: Mar. 13, 2008

(65) Prior Publication Data
US 2009/0272860 A1    Nov. 5, 2009

(30) Foreign Application Priority Data
Sep. 6, 2006  (DE) ............. 20 2006 013 678 U

(51) Int. Cl.
*F16M 11/02*  (2006.01)
(52) U.S. Cl. .......... 248/178.1; 248/163.1; 248/166; 248/440.1; 248/176.3
(58) Field of Classification Search .......... 248/178.1, 248/127, 129, 133, 441.1, 454, 457, 458, 248/121, 122.1, 371, 163, 164, 165, 166, 248/173.1, 163.1, 163.2, 274.1, 439, 440.1, 248/288.31, 177.1, 181.1, 181.2; 108/1, 108/5, 6, 8, 110, 115, 129; 198/632
See application file for complete search history.

(56) References Cited

U.S. PATENT DOCUMENTS

| | | | |
|---|---|---|---|
| 5,632,459 A * | 5/1997 | Brett | 248/122.1 |
| 6,179,116 B1 * | 1/2001 | Noniewicz et al. | 198/632 |
| 7,182,302 B2 * | 2/2007 | Noniewicz | 248/164 |
| 7,677,511 B2 * | 3/2010 | Radermacher | 248/188.9 |
| 7,836,833 B2 * | 11/2010 | Kumazawa | 108/115 |

FOREIGN PATENT DOCUMENTS

| | | |
|---|---|---|
| CA | 2 086 843 A1 | 1/1995 |
| DE | 295 09 763 U1 | 10/1995 |
| DE | 195 31 502 A1 | 8/1996 |
| DE | 295 12 937 U1 | 12/1996 |
| DE | 196 37 806 | 3/1998 |
| DE | 198 04 181 | 8/1999 |
| DE | 202 09 575 UI | 1/2003 |
| EP | 1 544 402 | 6/2005 |

* cited by examiner

*Primary Examiner* — Ramon Ramirez
*Assistant Examiner* — Todd M Epps
(74) *Attorney, Agent, or Firm* — DLA Piper LLP (US)

(57) ABSTRACT

A stand having a stand head for holding an object, having a stand column which supports the stand head and stands with its lower end on the ground, having at least one support leg which stands with its free end on the ground and supports the stand column, having a first joint which connects the support legs to the stand column in a movable fashion, such that the inclination of the stand column can be set by means of an adjustment of the first joint, and having a detachable leg locking arrangement which locks the support leg in a defined position relative to the stand column, wherein a counterweight is attached to the lower end of the stand column.

33 Claims, 7 Drawing Sheets

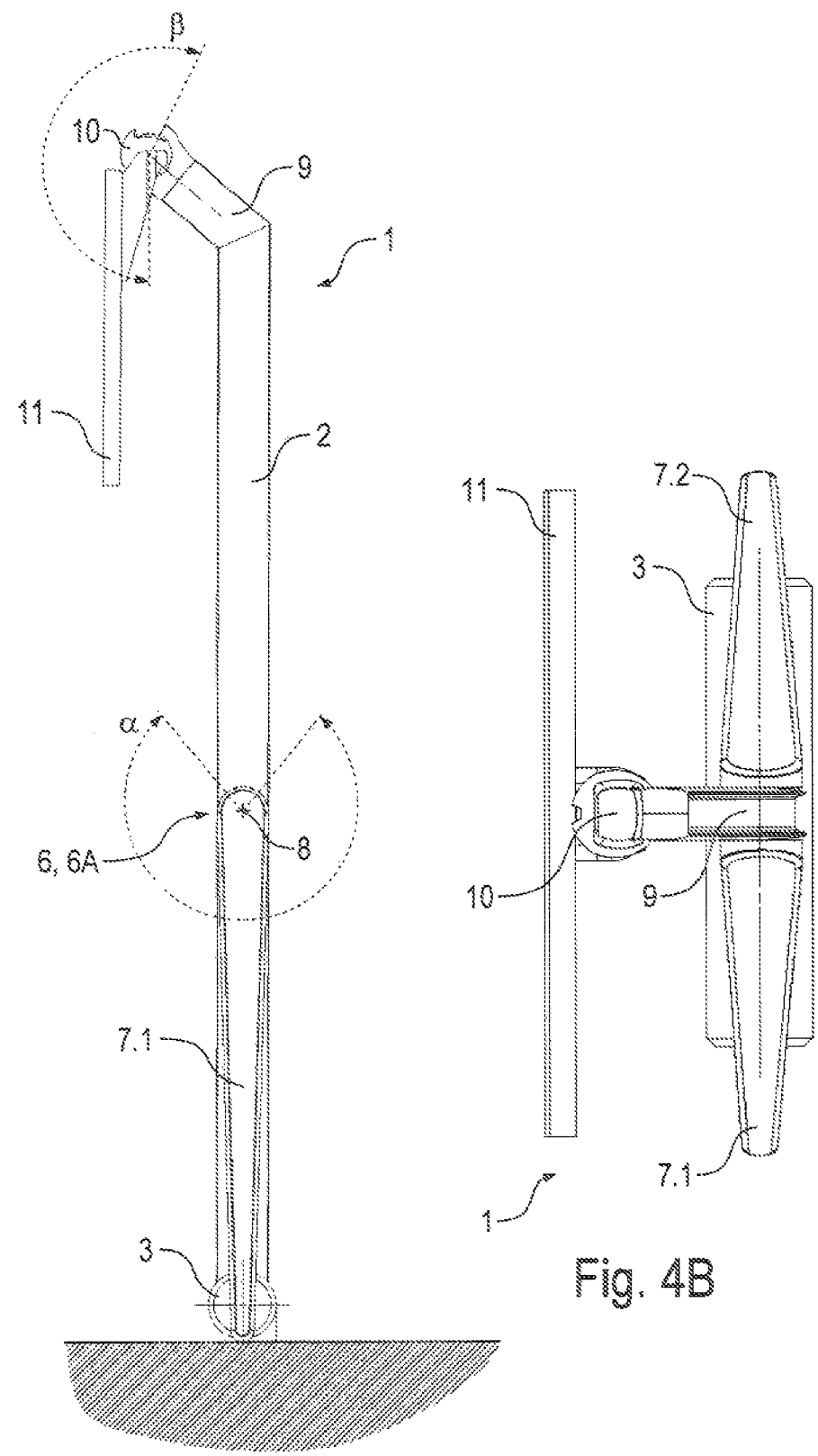

STAND

RELATED APPLICATION

This is a §371 of International Application No. PCT/EP2007/007110, with an international filing date of Aug. 10, 2007 (WO 2008/028554 A1, published Mar. 13, 2008), which is based on German Patent Application No. 20 2006 013 678.9 filed Sep. 6, 2006.

TECHNICAL FIELD

The disclosure relates to a stand, in particular for a standing desk or an occasional table.

BACKGROUND

To provide stable support for cameras, camera stands with three supporting legs are known, which are mounted foldably on a stand head and with their free ends form a stable multi-point support, the stand head comprising a mount for the attachment of a camera. In addition, camera stands of this type are known which comprise a stand head bearing a telescopic stand column, to the upper end of which a camera may be attached.

Another type of stand is known for example from DE 195 31 502 A1. The stand known from this publication comprises a stand column, which bears the stand head at its upper end and stands with its lower end on the floor. Moreover, this stand comprises two supporting legs, which are connected foldably to the stand column by means of a lockable revolute joint, such that the free ends of the supporting legs form a multi-point support together with the lower end of the stand column. The revolute joint is here fitted at floor-level at the lower end of the stand column, such that the supporting legs can be folded upwards so as to be able to store the stand in a space-saving manner. Furthermore, the inclination of the stand column and thus also of the stand head may be adjusted by changing the angle between the supporting legs and the stand column. A disadvantage of the known stand described above is, inter alia, the relatively high center of gravity, which has a negative effect on standing behaviour.

Another stand is known from DE 295 12 937 U1, in which the supporting legs are at a fixed angle to the stand column and may be displaced along the stand column by means of a prismatic joint. The inclination of the stand column may thus be varied in this case, by displacing the prismatic joint with the supporting legs along the stand column. However, this stand also has a relatively high center of gravity, which has a negative effect on standing behaviour.

SUMMARY

A counterweight is attached to the lower end of the stand column, so as to improve the standing behaviour of the stand. In one example, the center of gravity of the stand is thereby located below the joint for the supporting legs. The counterweight at the lower end of the stand column may, for example, have a mass of at least 4 kg, 6 kg, 8 kg or at least 10 kg. However, with regard to the mass of the counterweight, there is no restriction to the above-stated mass values, but rather other counterweight masses are also feasible.

Furthermore, in an exemplary embodiment, the center of gravity of the stand lies above the standing surface, so that the stand does not tip over.

In one variant the joint for the supporting legs is a revolute joint, such that the supporting legs can be swiveled relative to the stand column, in order to adjust the inclination of the stand column.

In another variant, on the other hand, the supporting legs are hinged to the stand column by a prismatic joint. In this case the supporting legs are thus at a fixed angle relative to the stand column and may be displaced along the stand column with the prismatic joint, in order to adjust the inclination of the stand column.

In one example, the above-mentioned revolute joint for the supporting legs is not arranged at floor-level in the vicinity of the contact point of the stand column, but rather in the middle area of the stand column. The supporting legs are subjected substantially only to compression loading and not to bending stress, which allows a greater mechanical load carrying capacity or a lower material usage to achieve the desired load carrying capacity. The phrase "a middle area of the stand column" as used herein should be understood in general terms and serves only for differentiation relative to the above-described known stand according to DE 195 31 502 A1. In one example, however, the revolute joint for the supporting legs is arranged in the middle third of the stand column.

In one variant, the stand column is supported by a plurality of supporting legs, for example by two supporting legs. The free ends of the supporting legs then form together with the lower end of the stand column a multipoint support, so preventing the stand from tipping sideways.

In another variant, on the other hand, the stand column is supported by a single supporting leg. In this case, the supporting leg comprises a contact area which extends sufficiently sideways to prevent lateral tipping of the stand. For simplicity's sake, however, for illustration purposes the following hereinafter describe the example with a plurality of supporting legs.

Furthermore, the stand may also comprise an unlockable leg lock, which locks the supporting legs in a specific position relative to the stand column.

In one variant this leg lock is incorporated into the revolute joint of the supporting legs, such that the supporting legs are without connection between the revolute joint and the floor, i.e. do not comprise any further elements bracing them together with the stand column.

In another variant, on the other hand, the leg lock for the supporting legs comprises supporting struts resistant to tensile and/or compressive loads, with which the supporting legs rest against the stand column, to effect locking. In this variant the leg lock may likewise allow various angular positions, in that the supporting struts may be fitted for example in corresponding snap-in receptacles on the stand column.

In one example, the supporting legs may be swiveled back past the stand column, which allows a space-saving configuration for use of the stand as a standing table. The supporting legs may thus be swiveled over from one side of the stand column to the other side of the stand column.

Furthermore, the stand head of the stand according to one example comprises a further lockable revolute joint, to which a holding element for the object to be held in place is inclinably hinged. The holding element comprises a tray or a platform, on which for example sheet music, a speech script or a laptop or notebook computer may be placed. However, the example is not limited with regard to the holding element to a tray, but rather may in principle also be configured with other holding elements, which are known from conventional stands.

In an exemplary embodiment the supporting legs and/or the holding element may be folded into a storage or transport position, in which the supporting legs or the holding element extend parallel to the stand column. The stand in this example only takes up a small amount of space in the storage or transport position.

Furthermore, provision is made for the supporting legs to have a greater length from their axis of rotation to the floor than the stand column has from the axis of rotation of the supporting legs to the floor. The consequence of this is that, in the folded-up state, the stand legs project with their free ends beyond the lower end of the stand column and so form stable support points. This may be used where, as will be described in detail, rollers are fitted at the lower end of the stand column, since the free ends of the supporting legs projecting beyond the rollers then prevent the stand from rolling away.

The two revolute joints for the supporting legs and the holding element in this example have parallel axes of rotation, which extend at right angles to the stand column.

Furthermore, the revolute joint for the holding element and/or the revolute joint for the supporting legs comprise(s) an angular indexing means, which effects locking at particular index angles. The holding element or the supporting legs is/are thus not locked at continuously selectable locking angles, but rather at the index angles, which are predetermined by the angular indexing means.

The angular indexing means of the two revolute joints for the holding element and the supporting legs respectively are conformed to one another in such a way that each index angle of the revolute joint for the supporting legs is associated with one index angle of the revolute joint for the holding element, in which the holding element (e.g. a tray) exhibits a predetermined, in particular horizontal, angle of inclination.

Instead of an angular indexing means, however, it is possible for the revolute joints for the holding element and the supporting legs respectively to allow continuous, infinitely variable angle adjustment.

In addition, it is possible for the two revolute joints for the holding element and the supporting legs to be mechanically coupled. The effect of the coupling is that angle adjustment of the supporting legs effects a corresponding angle adjustment of the holding element, wherein the coupling may effect angle transmission. The angle transmission has the consequence that a specific angle adjustment α leads to a predetermined angle adjustment k·α with a coupling factor k, wherein the coupling factor k is mechanically predetermined by the coupling. The coupling factor is fixed constructionally such that the holding element always adopts a horizontal position irrespective of the position of the supporting legs.

The revolute joint for the holding element and/or the revolute joint for the supporting legs may has/have just one degree of freedom and thus allow(s) only rotation or folding. This enables simple, stable construction of the revolute joints.

However it is alternatively possible for the revolute joint for the holding element and/or the revolute joint for the supporting legs to take the form of a ball-and-socket joint, which has several degrees of freedom.

In addition, an operating element is provided, which allows manual locking and unlocking of the revolute joint for the holding element and/or of the revolute joint for the supporting legs, the operating element being mounted for example on the holding element, so allowing comfortable operation. The operating element may effect locking via Bowden cables, for example.

It has already been mentioned briefly above that the stand column may comprise a roller at its lower end, which simplifies handling of the stand, since the stand may be rolled along during transportation. The roller is here rotatable about an axis of rotation which extends at right angles to the stand column and parallel to the axis of rotation of the holding element and/or the supporting legs. A roller is mounted on each side of the stand column, such that the two rollers together with the two supporting legs form a stable 4-point support.

Furthermore, the counterweight already mentioned above is formed by the roller, which, to achieve a heavy weight, may consist for example of cast iron.

It should also be mentioned that, in the case of the stand, the supporting legs and/or the stand column may have/has a fixed, non-telescopic length. However, there is no limitation to stands in which the supporting legs or the stand column have a fixed length, but may also be configured with conventional telescopic supporting legs or stand columns.

In addition, the length of the stand column from the revolute joint for the supporting legs to the stand head may be greater than the length of the stand column from the revolute joint for the supporting legs to the floor.

It should also be mentioned that the revolute joint for the holding element (e.g. a tray) and/or the revolute joint for the supporting legs may has/have a lockable angular range of at least 90°, 135°, 180°, 235° or even 270°, to allow many different configurations. The revolute joint for the supporting legs may even have an unlimited angular range, such that the supporting legs can be rotated freely into the desired angular position.

It should additionally be mentioned that the term "stand column" used for the purposes herein should be understood in general terms and is not limited to straight, elongate tubes. Instead, the stand column may also consist for example of a frame structure or a plate. It is also possible for the stand column to be straight or curved or to have bend points. Furthermore, the stand column may optionally have a hollow profile or be solid.

BRIEF DESCRIPTION OF THE DRAWINGS

FIG. 4A is a side view of the same stand in a transport and storage position and FIG. 4B is a plan view of the stand according to FIG. 4A.

DETAILED DESCRIPTION

Figure 1A:
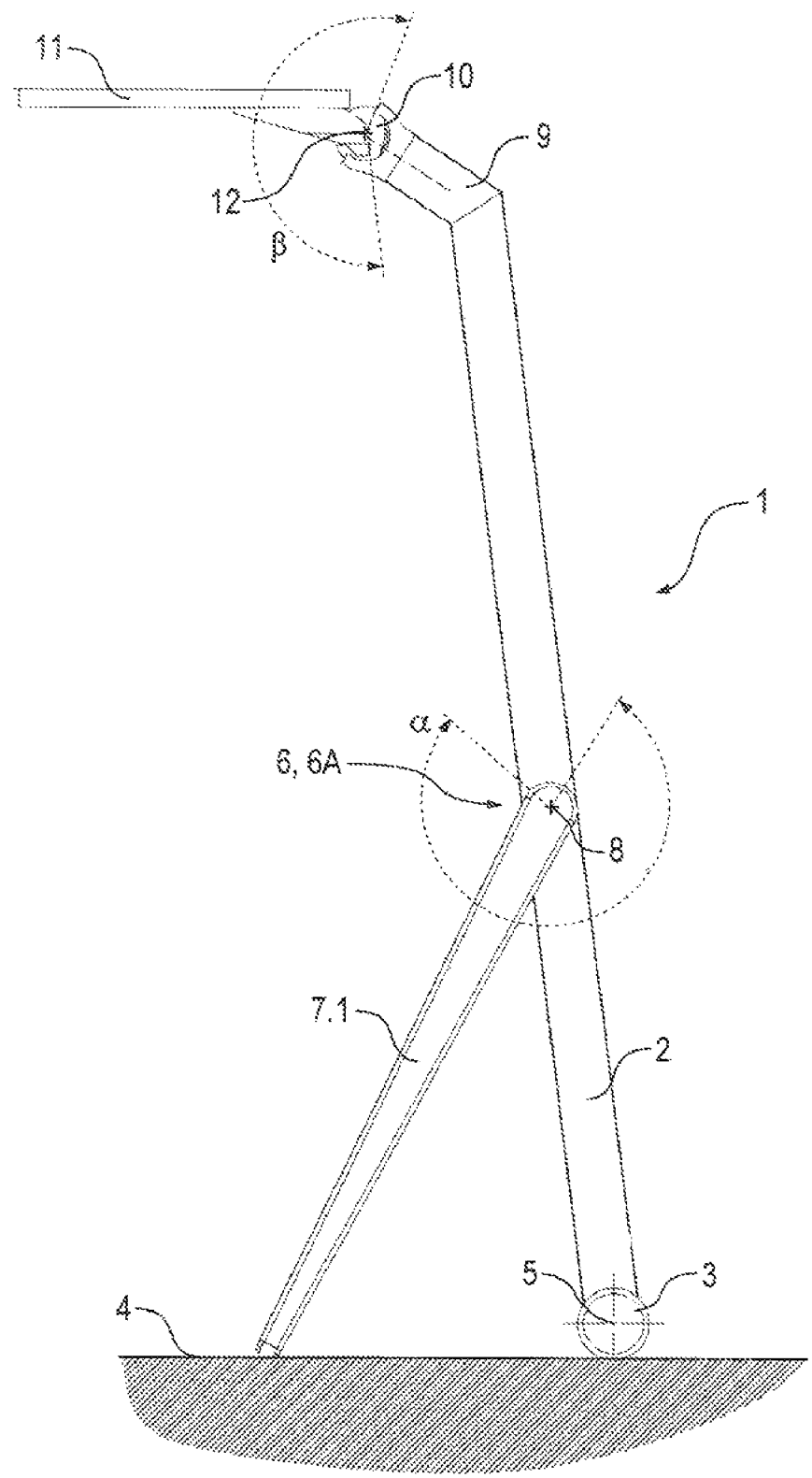
FIG. 1A is a side view of a stand according to an exemplary embodiment configured as a standing desk.
Figure 1B:
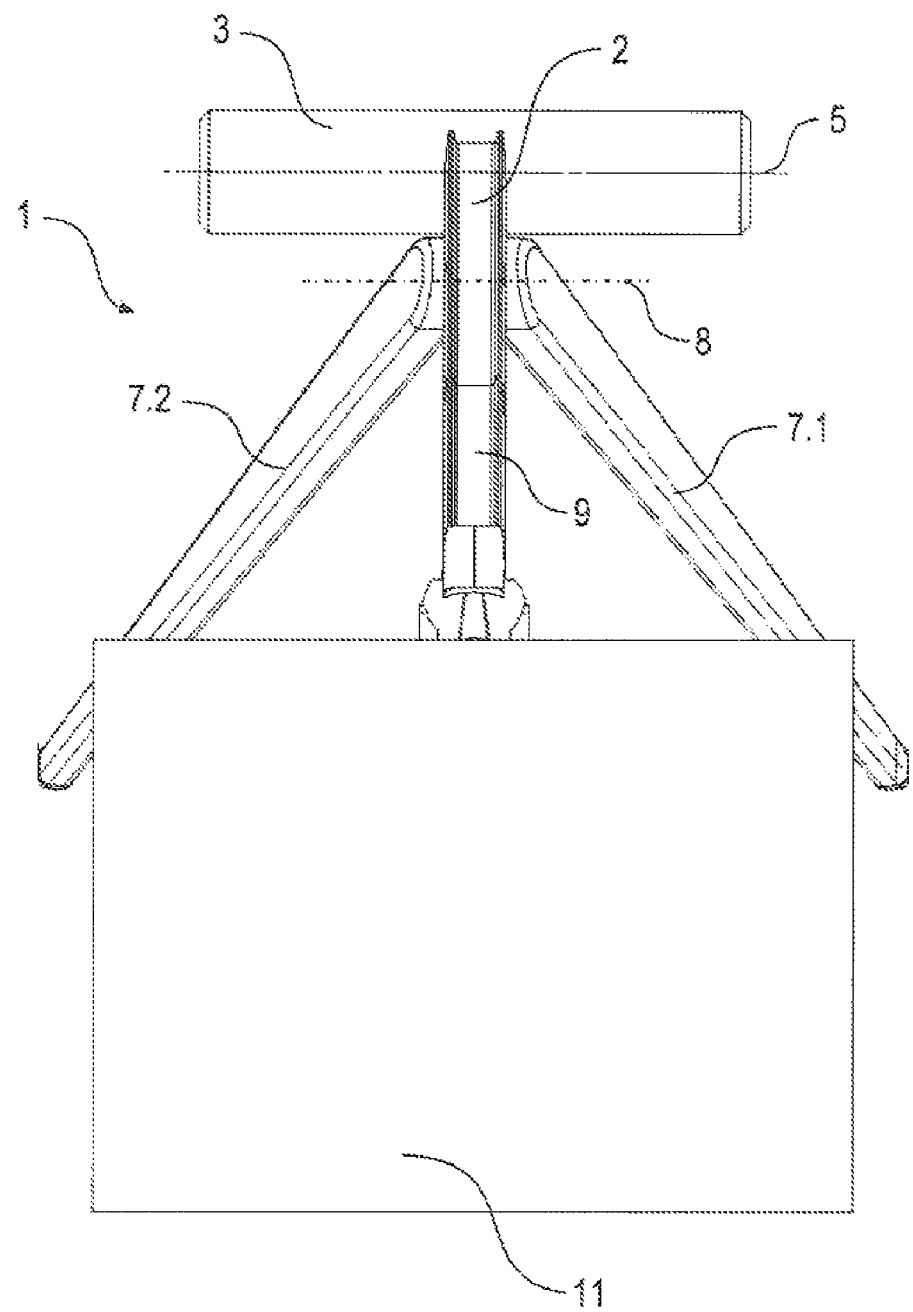
FIG. 1B is a plan view of the stand according to FIG. 1A.

The drawings show an exemplary embodiment of a stand 1 which may for example be used as a notebook computer stand and moreover has many different possible applications, for example as a music stand or occasional table, as will be described below in detail.

The stand 1 comprises an elongate stand column 2, which bears a rotatably mounted roller 3 at its lower end, with which the stand column 1 stands on a floor 4. The roller 3 has a plurality of functions, which will be described below.

On the one hand the roller 3 is rotatable about an axis of rotation 5, which extends at right angles to the stand column 2, such that the stand 1 can be rolled away on the roller 3, so simplifying handling.

On the other hand the roller 3 serves as a counterweight for improving the stability and therefore has a mass of 8 kg. The center of gravity of the stand 1 is thus below the revolute joint 6.

In addition, the roller 3 extends considerably sideways, which contributes to making the stand 1 stable, since the roller 3 helps to prevent the stand 1 from tipping over.

In the middle area of the stand column 2 there is located a revolute joint 6 for two supporting legs 7.1, 7.2, the supporting legs 7.1, 7.2 being rotatable or foldable relative to the stand column 2 about an axis of rotation 8. The axis of rotation 8 of the supporting legs 7.1, 7.2 likewise extends at right angles to the stand column 2 and parallel to the axis of rotation 5 of the roller 3. An unlockable leg lock 6A is also included in the stand 1 at the revolute joint 6. The relative to the stand column 2. The unlockable leg lock 6A is incorporated into the revolute joint 6 such that at least one of the supporting legs 7.1, 7.2 is without connection between the revolute joint 6 and the floor 4.

The two supporting legs 7.1, 7.2 rest with their free ends on the floor 4, such that the two supporting legs 7.1, 7.2, together with the lateral ends of the roller 5, form a stable 4-point support.

The revolute joint 6 here opens up the possibility for the two supporting legs 7.1, 7.2 of an infinitely variable swivel range α of more than 270°, as is shown in the drawings by broken lines. This relatively large swivel range of the supporting legs 7.1, 7.2 advantageously makes possible many different configurations of the stand 1, as will be described in detail below.

At its upper end the stand column 2 bears a stand head 9 with a further revolute joint 10 for inclinable mounting of a tray 11, on which a notebook computer or a speech script may be placed, for example. The tray 11 is rotatable about an axis of rotation 12, the axis of rotation 12 being oriented at right angles to the longitudinal axis of the stand column 2 and parallel to the two axes of rotation 5, 8.

The revolute joint 10 here opens up the possibility of an infinitely variable free swivel range β of more than 180°, as is shown in the drawings by broken lines. This relatively large swivel range of the tray 11 advantageously makes possible many different configurations for different purposes, as will be described in detail below.

Figure 2A:
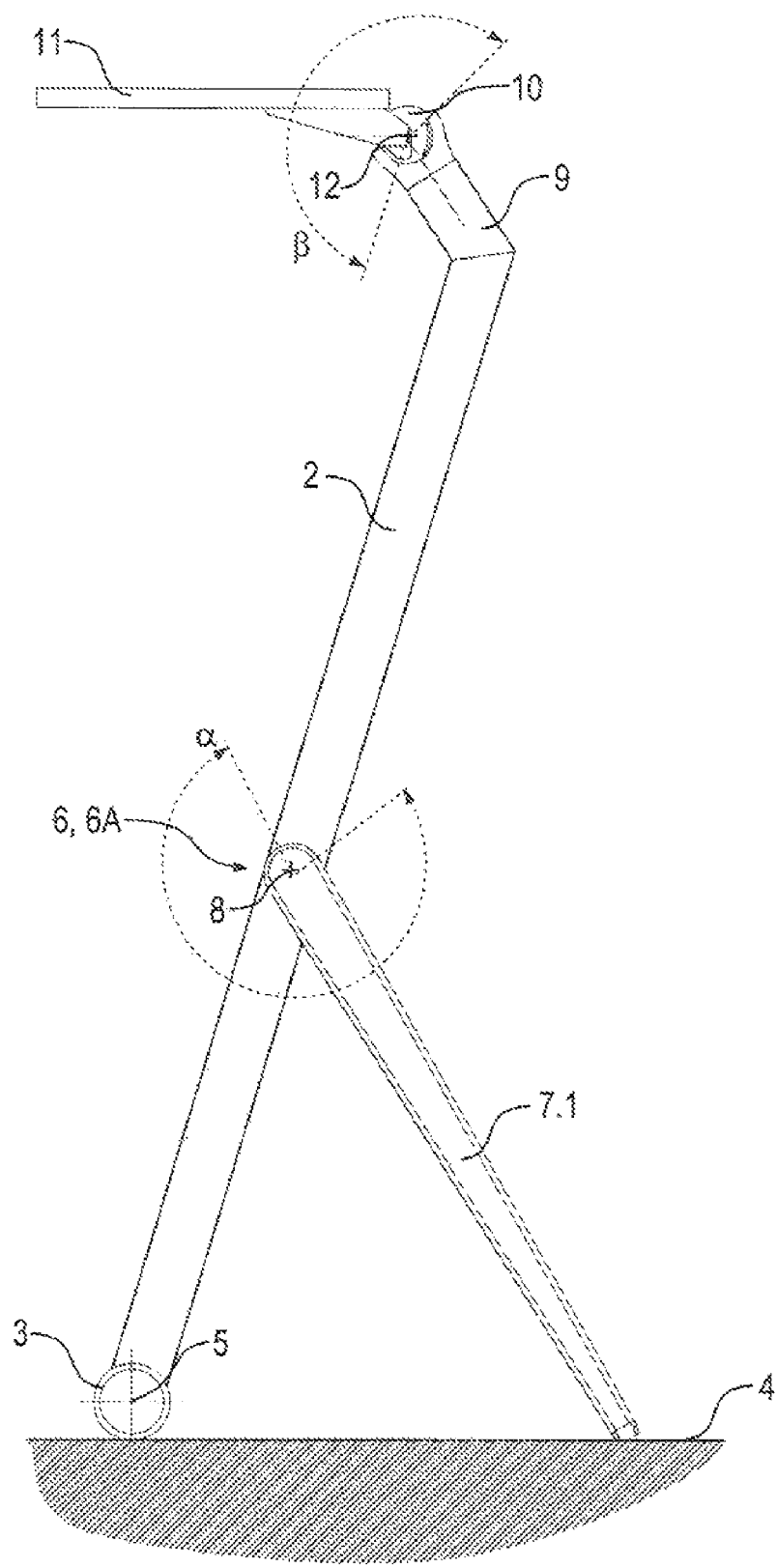
FIG. 2A is a side view of another configuration of the same stand, this configuration likewise serving as a standing desk.
Figure 2B:
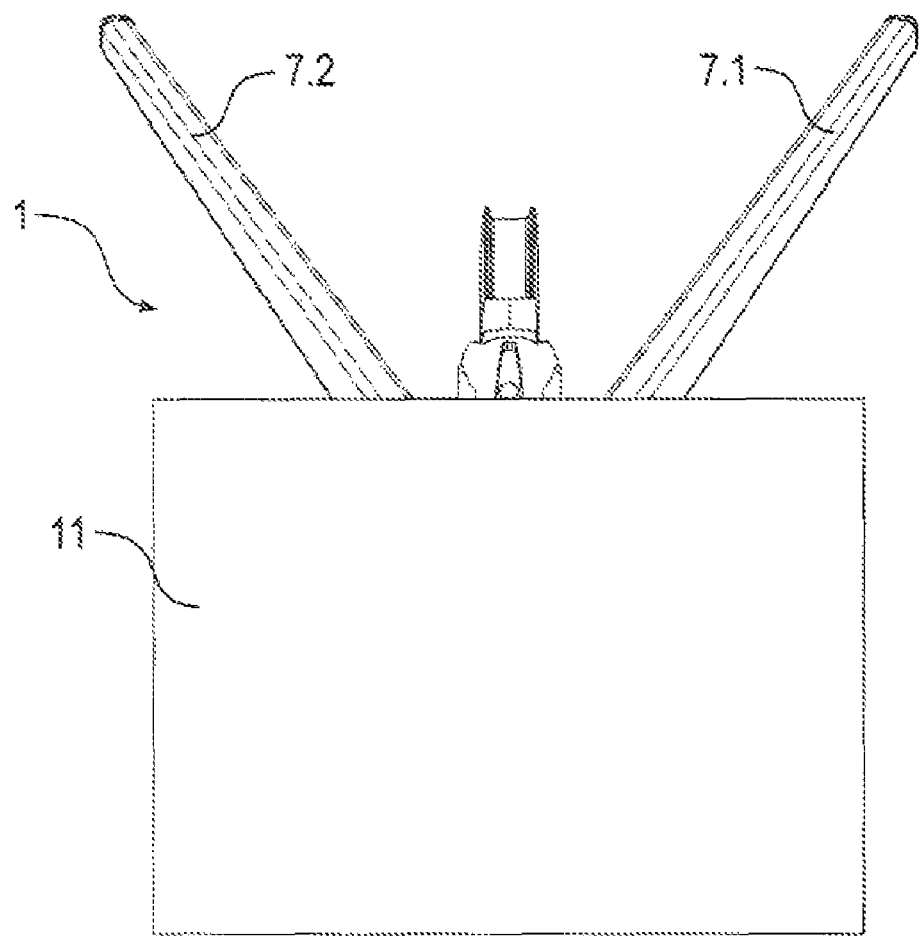
FIG. 2B is a plan view of the configuration according to FIG. 2A.

FIGS. 2a and 2b show the same stand 1 in a different configuration, which likewise serves as a standing desk. To avoid repetition, reference is therefore made to the above description. A particular feature of this exemplary embodiment is that the two supporting legs 7.1, 7.2 are folded over to the opposite side of the stand column 2 from the tray 11.

Figure 3A:
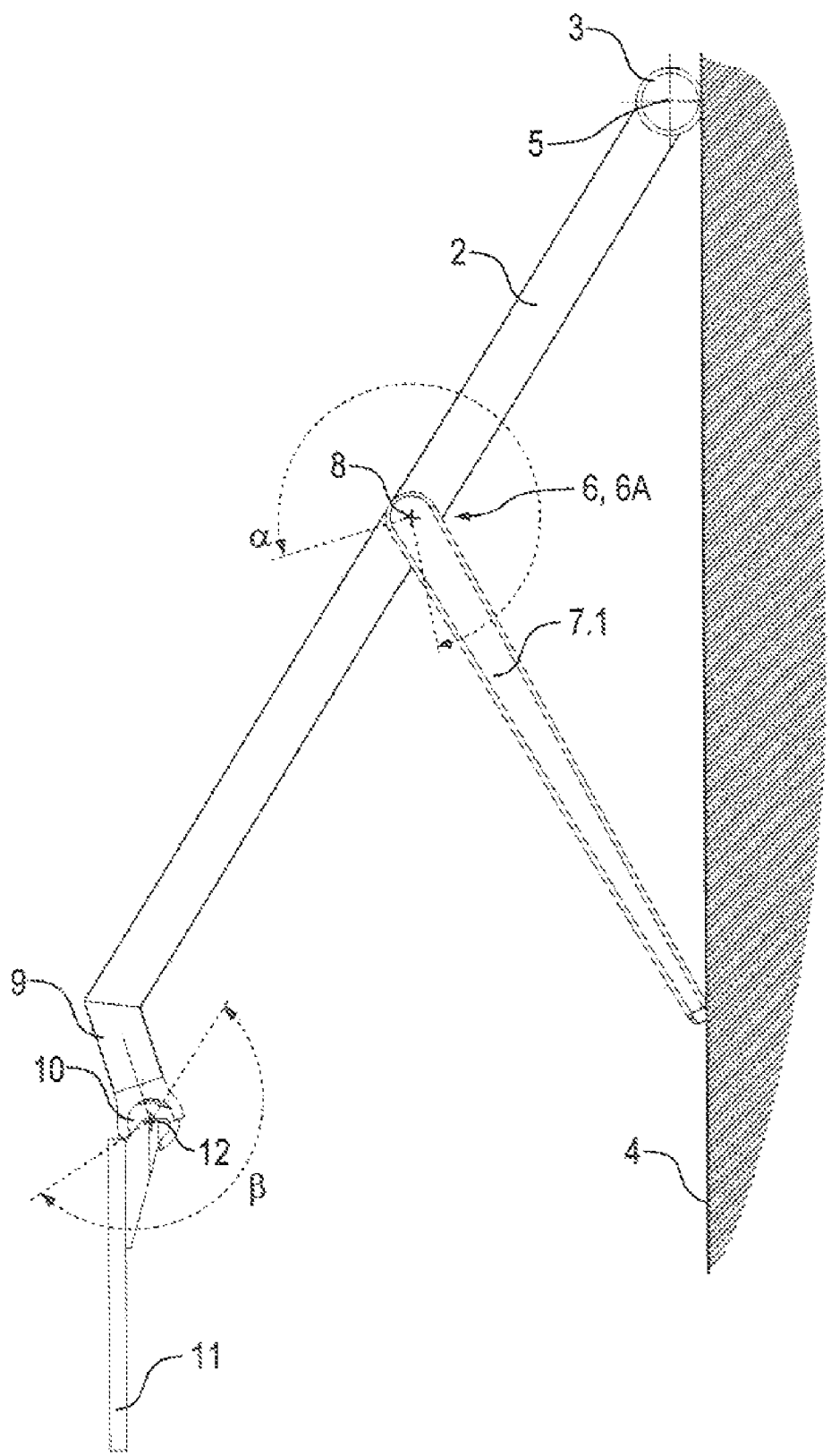
FIG. 3A is a side view of the same stand configured as an occasional table.
Figure 3B:
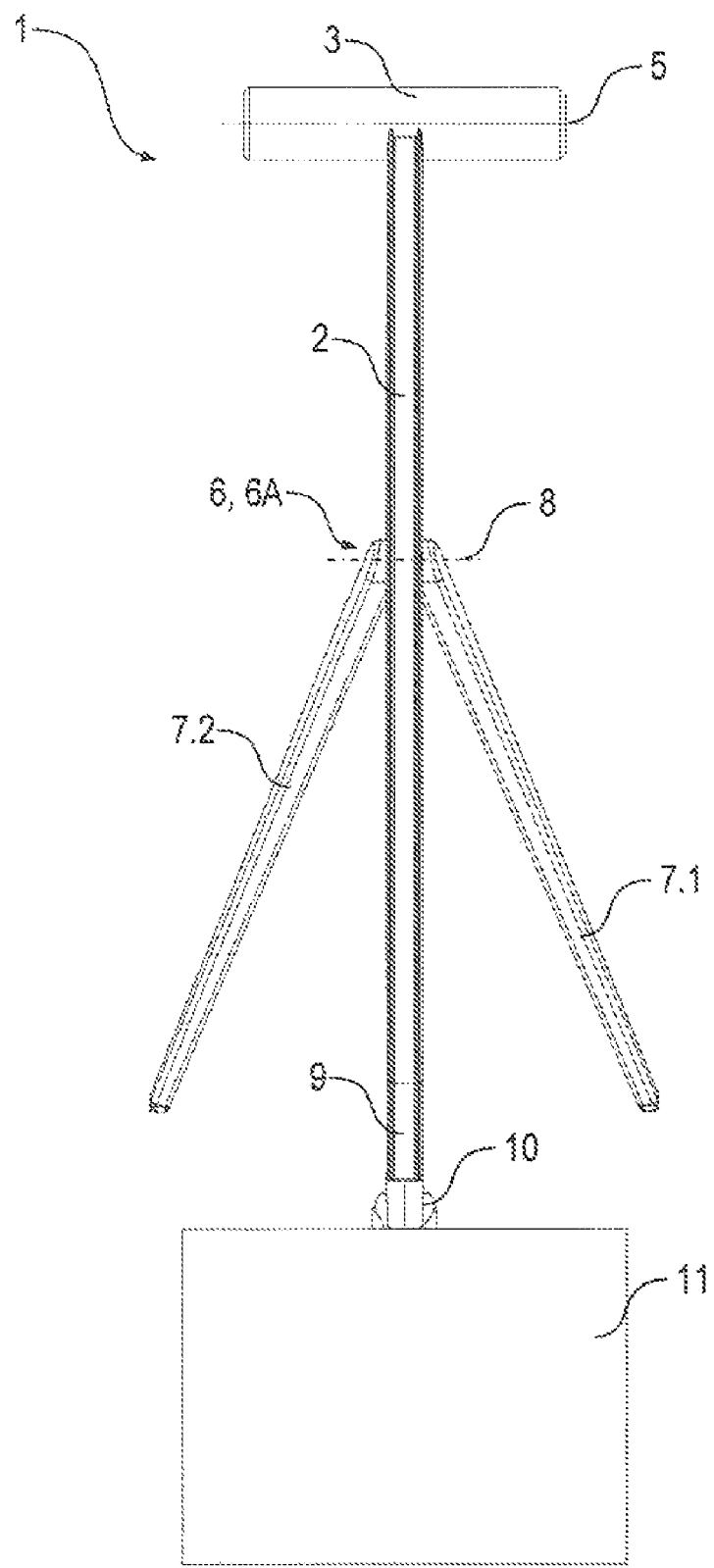
FIG. 3B is a plan view of the configuration according to FIG. 3A.

FIGS. 3a and 3b show a further possible configuration of the stand 1 according to an exemplary embodiment of the invention, which serves as an occasional table. To avoid repetition, reference is therefore again made to the above description.

A particular feature of this exemplary embodiment is that the two supporting legs 7.1, 7.2 have been folded a long way towards the stand head 9 and form an obtuse angle of roughly 115° with the free lower end of the stand column 2 below the revolute joint 6.

Accordingly, the tray 11 has likewise been folded further upwards and is inclined horizontally relative to the floor 4, such that items may be set down on the tray 11.

Finally, FIGS. 4A and 4B show a transportation and storage position of the stand 1, in which the stand legs 7.1, 7.2 are folded up such that the stand legs 7.1, 7.2 are disposed parallel to the stand column 2. In this transportation and storage position the free ends of the supporting legs 7.1, 7.2 project beyond the roller 3 at the lower end of the stand column 2, such that the free ends of the supporting legs 7.1, 7.2 stop the stand 1 from rolling away.

Furthermore, the tray 11 is likewise folded so far downwards that the tray 11 is parallel to the stand column 2. In the transportation and storage position the stand 1 thus advantageously takes up little space.

The stand is not limited to the above-described preferred exemplary embodiments. Instead, many variants and modifications are possible, which also make use of the concept and thus fall within the scope of protection.

The invention claimed is:

1. A stand comprising:
 a) a stand head for holding an object;
 b) a stand column bearing the stand head and standing with its lower end on a floor;
 c) at least one supporting leg, which stands with its free end on the floor and supports the stand column;
 d) a first joint, wherein
  d1) the first joint connects the at least one supporting leg movably to the stand column, such that the inclination of the stand column may be adjusted by adjustment of the first joint, and
  d2) the first joint comprising a first revolute joint, which connects the at least one supporting leg foldably to the stand column;
 e) an unlockable leg lock incorporated into the first resolute joint, wherein
  e1) the unlockable leg lock locks the at least one supporting leg in a specific position relative to the stand column without any further elements bracing the at least one supporting leg to the stand column, and
  e2) the first revolute joint has a lockable angular range of at least 90°; and
 f) a counterweight which is fitted at the lower end of the stand column, so that the stand has a center of gravity which is located below the first joint.

2. The stand according to claim 1, wherein the first revolute joint is arranged in a middle area of the stand column.

3. The stand according to claim 1, wherein a single supporting leg is provided, which comprises a laterally extending contact area.

4. The stand according to claim 1, wherein a plurality of supporting legs support the stand column.

5. The stand according to claim 1, wherein the at least one supporting leg is configured to swivel back past the stand column.

6. The stand according to claim 1, wherein the supporting leg has a greater length from a first axis of rotation to the floor than the stand column has from the first axis of rotation to the floor.

7. The stand according to claim 1, wherein the axis of rotation of the at least one supporting leg and the axis of rotation of the holding element extend substantially at right angles to the stand column.

8. The stand according to claim 1, wherein the at least one supporting leg and the stand column have a fixed and non-telescopic length.

9. The stand according to claim 1, wherein the length of the stand column from the first revolute joint to the stand head is greater than the length of the stand column from the first revolute joint to the floor.

10. The stand according to claim 1, wherein the first joint is a prismatic joint, which is displaceable together with the at least one supporting leg along the stand column, the at least one supporting leg exhibiting a fixed angular position relative to the stand column.

11. The stand according to claim 1, wherein the at least one supporting leg is free of a counter weight.

12. The stand according to claim 1, wherein the stand column comprises a fixed non-telescopic length.

13. The stand according to claim 1, wherein the stand head comprises a lockable second revolute joint, to which a holding element for the object to be held in place is hinged inclinably.

14. The stand according to claim 13, wherein the at least one supporting leg and the holding element are configured for folding into a storage position parallel to the stand column.

15. The stand according to claim 13, wherein the two revolute joints for the supporting leg and the holding element comprise parallel axes of rotation.

16. The stand according to claim 13, wherein the first revolute joint and the second revolute joint are infinitely variably adjustable and lockable.

17. The stand according to claim 13, wherein the first revolute joint and the second revolute joint have just one degree of freedom.

18. The stand according to claim 13, wherein the second revolute joint takes the form of a ball-and-socket joint.

19. The stand according to claim 13, wherein the holding element is a tray.

20. The stand according to claim 13, wherein the second revolute joint has a lockable angular range of at least 90°.

21. The stand according to claim 13, wherein the first revolute joint and the second revolute joint each comprise an angular indexing means for locking the first and second revolute joints at specific index angles.

22. The stand according to claim 21, wherein the angular indexing means of the two revolute joints are conformed to one another in such a way that each index angle of the first revolute joint for the at least one supporting leg is associated with one index angle of the second revolute joint for the holding element, in which the holding element exhibits a predetermined angle of inclination.

23. The stand according to claim 22, wherein the predetermined angle of inclination is horizontal.

24. The stand according to claim 13, further comprising an operating element for manual locking and for manual unlocking of the first revolute joint and the second revolute joint.

25. The stand according to claim 24, wherein the operating element is mounted on the holding element.

26. The stand according to claim 1, wherein the stand column comprises at least one roller at its lower end.

27. The stand according to claim 26, wherein the roller is rotatable about a third axis of rotation, the third axis of rotation being oriented parallel to a first axis of rotation and parallel to a second axis of rotation.

28. The stand according to claim 26, wherein the stand column comprises at least one roller on each side at its lower end, the rollers forming a multipoint support together with the at least one supporting leg.

29. The stand according to claim 28, wherein the roller forms the counterweight.

30. An item of furniture having a stand according to claim 1.

31. An item of furniture according to claim 30, wherein it takes the form of a standing desk.

32. An item of furniture according to claim 30, wherein it takes the form of an occasional table.

33. A stand comprising:
a) a stand head for holding an object;
b) a stand column bearing the stand head and standing with its lower end on a floor;
c) at least one supporting leg, which stands with its free end on the floor and supports the stand column;
d) a first joint, wherein
   d1) the first joint connects the at least one supporting leg movably to the stand column, such that the inclination of the stand column may be adjusted by adjustment of the first joint, and
   d2) the first joint comprising a first revolute joint, which connects the at least one supporting leg foldably to the stand column;
e) an unlockable leg lock incorporated into the first resolute joint, wherein
   e1) the unlockable leg lock locks the at least one supporting leg in a specific position relative to the stand column without any further elements bracing the at least one supporting leg to the stand column, and
   e2) the first revolute joint has a lockable angular range of at least 90°; and
f) a counterweight which is fitted at the lower end of the stand column, so that the stand has a center of gravity which is located below the first joint;
   wherein the stand head comprises a lockable second revolute joint, to which a holding element for the object to be held in place is hinged inclinably,
   wherein the first revolute joint and the second revolute joint each comprise an angular indexing means for locking the first and second revolute joints at specific index angles, such that the holding element and the at least one supporting leg are not locked at continuously selectable locking angles, and
   wherein the angular indexing means of the first and second revolute joints are confirmed to one another in such a way that each index angle of the first revolute joint for the at least one supporting leg is associated with one index angle of the second revolute joint for the holding element, in which the holding element exhibits a predetermined angle of inclination.

* * * * *